United States Patent [19]
Elkins et al.

[11] 3,743,368
[45] July 3, 1973

[54] SEALED BEARING
[75] Inventors: William Elkins, Canoga Park; Eugene Connell, Thousand Oaks, both of Calif.
[73] Assignee: The Garrett Corporation, Los Angeles, Calif.
[22] Filed: Feb. 2, 1968
[21] Appl. No.: 702,569

[52] U.S. Cl.............................. 308/187.2, 277/206
[51] Int. Cl..................... F16c 1/24, F16j 9/08
[58] Field of Search...................... 308/187.1, 187.8, 308/201, 187, 35.6; 277/206

[56] References Cited
UNITED STATES PATENTS
| | | |
|---|---|---|
| 3,341,212 | 9/1967 | Bagnard et al.................... 277/206 |
| 3,011,841 | 12/1961 | Moyer............................ 308/187.1 |
| 3,083,023 | 3/1963 | Creavey....................... 308/187.2 X |
| 3,113,812 | 12/1963 | Dotter............................ 308/187.1 |
| 3,366,428 | 1/1968 | Smith............................ 308/187.2 |

FOREIGN PATENTS OR APPLICATIONS
| | | | |
|---|---|---|---|
| 1,201,927 | 1/1960 | France............................ 308/217 |
| 615,107 | 1/1949 | Great Britain.................. 308/187.2 |
| 1,104,870 | 11/1955 | France............................ 308/201 |

Primary Examiner—Benjamin A. Borchelt
Assistant Examiner—J. M. Hanley
Attorney—Orville R. Seidner and John N. Hazelwood

[57] ABSTRACT

Relatively rotatable annular bearing members, disposed at a rotary joint of a pressurizable garment, define facing surfaces against which bear compliantly the land surfaces of resilient lips of a plastic fluid seal element. Preferably, the lips of the element extend from the edge of, and form a part of, a cage for the rolling elements of the bearing.

4 Claims, 3 Drawing Figures

PATENTED JUL 3 1973

3,743,368

INVENTORS.
WILLIAM ELKINS
EUGENE W. CONNELL

BY Orville R. Seidner

AGENT

SEALED BEARING

BACKGROUND OF THE INVENTION

The invention pertains to the field of rotary joints for pressurizable garments, and in particular is concerned with bearing members and seals therefor as required at the joint junction of relatively rotatable garment members. Such relatively rotatable members may comprise, for example, the forearm and glove portions of a pressurizable garment where the joint junction is at the wrist of the wearer of the garment.

It is obvious, of course, that a person must have a high degree of freedom of movement while enclosed in a pressurizable garment, such as a space suit for example, in order to have mobility and to be able to perform tasks. Certain joints, such as at the wrist, require rotative movement which may be accomplished by relatively rotative bearing members of a low friction type such as ball-bearing or other anti-friction roller arrangements. With such an arrangement it is equally obvious that sealing means must be provided to prevent the escape of air from inside the garment past the rotary bearing arrangement, else the garment will become unpressurized and inoperative for the purpose and probably pose a hazard to the life of the wearer of the garment.

Given the foregoing requirements, it is diffucult enough to provide a sealed bearing arrangement within the present state of the art. But even beyond such requirements it is found that there is an additional limiting factor which calls for a sealed bearing in which the torque, as between the relatively rotative members, is at an almost absurdly low figure. This is so, because the torque required to overcome friction must be as low as possible so that the wearer of the suit is not unduly fatigued just from the joint friction.

It should be noted that the bearing is of relatively low velocity type in which the relatively rotative members move only with the speed of rotation of the hand and forearm, for example. But it should be further noted that the angular distance moved is relatively small, with generally random frequent movements in first one direction, then another. From this it is obvious that break-away friction is at least as important as running friction for a bearing to be used at the rotative joint of a pressurizable garment.

SUMMARY

The present invention has solved the problems of the prior art, as discussed briefly above, by providing a sealed bearing comprised of a pair of annular bearing members with a seal element disposed therebetween, the seal being comprised of a pair of resilient lips which are arranged to bear compliantly against surfaces on the bearing members. Suitably, the bearing may be of the anti-friction type in which the bearing members define raceway surfaces with rolling elements disposed therebetween.

Preferably, the bearing arrangement includes a cage for the rolling elements and the lips of the seal extend outwardly from one edge of the cage. The combination cage and seal arrangement results functionally in displacement and velocity, of either seal lip with respect to its corresponding bearing member surface, being one-half that of the displacement and velocity of the bearing members with respect to each other. This is so because the rolling elements which cause the cage to move are disposed between the bearing members, and move with displacement and velocity of one-half that of the bearing members with respect to each other. Since the velocity of seal lip movement on seal surface is one-half, the possible criticality of the ususl pressure-velocity consideration of a journal and bearing is greatly relieved, and the seal lips may thus be fabricated of a low friction plastic material.

In such an arrangement, it is preferred that the cage and seal form an integral structure fabricated ed from a low friction plastic material such as a polytetrafluoroethylene known as Teflon. The orientation of the lips with respect to the bearing members, and particularly with reference to the possible direction of fluid flow therethrough from the pressurizable garment, is preferably such that the pressure in the garment tends to enhance the seal of the lips against the bearing member surfaces. To this end it is desirable that the lips form an acute angled surfaces thereof.

DESCRIPTION OF THE PREFERRED EMBODIMENT

Figure 1:
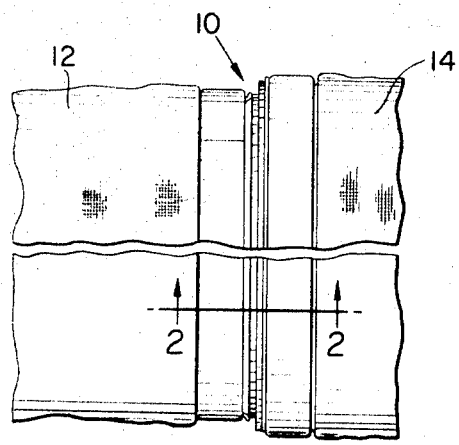
FIG. 1 is an illustration of an embodiment of a rotary joint for a pressurizable garment.

Referring to FIG. 1, the sealed bearing 10 is shown as disposed between the relatively round tubular portions 12 and 14 of a pressurizable garment. The bearing 10 may be disposed about the wrist of the wearer of the garment, for example, in which case the tubular portion 12 may be the end portion of a garment forearm member and the portion 14 may be a cuff portion of a glove member. Other than the fragmental portions illustrated, the garment forearm and glove members are not shown further, or in greater detail, sinc they form no part of the invention.

Figure 2:
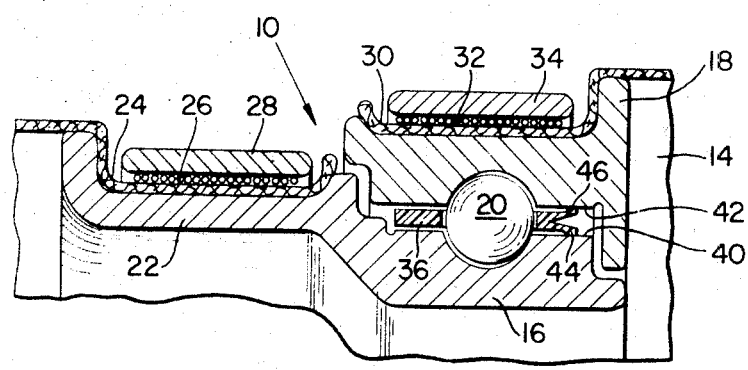
FIG. 2 is an enlarged illustration in cross-section of a fragmentary portion of the joint, taken on the line 2—2 of FIG. 1.

Referring to FIG. 2, the bearing 10 is shown as comprising an inner annular bearing member 16 and an outer annular bearing member 18. The members 16 and 18 are seen as forming inner and outer races for an angular contact ball bearing structure, between which races is disposed a plurality of anti-friction balls of which one is shown at 20. The general arrangement of such structure is well known in the art and need not be illustrated or described.

The inner race or bearing member 16 is provided with an axially extending annulus 22, over the outer surface of which is disposed the end 24 of the tubular portion 12 of the pressurizable garment. The end 24 is secured on the outer periphery of the annulus 22 by a layer of serving thread 26 over which is disposed a protective band 26. In similar fashion, the end 30 of the tubular portion 14 of the pressurizable garment is secured at the outer periphery of bearing member 18 by a layer of serving thread 32, over which is disposed the protective band 34.

As a practical matter of obtaining proper function of the rolling elements between the bearing members 16 and 18, it is desirable to provide a separator which spaces the rolling elements at substantially equal intervals to each other. To this end there is provided an annular cage 36 which is disposed between the members 16 and 18. As shown fragmentarily in FIG. 3, the cage defines a plurality of equa-spaced open ball wells 38 arranged to receive the anti-friction balls, exemplified by the ball 20 in FIG. 2.

Figure 3:
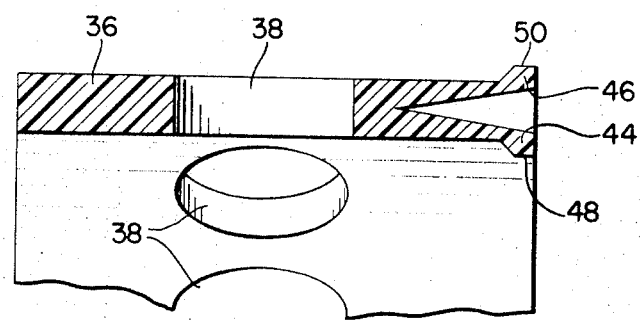
FIG. 3 is a still further enlarged illustration in cross-section of a portion of the ball cage and lip seal appearing in FIG. 2.

It is apparent, of course, that when the garment employing the rotary joint 10 is pressurized, there is an escape path for the pressurizing air through the raceway paths between the inner and outer bearing members 16 and 18. A novel feature of the proposed invention is a sealing arrangement which prevents the escape of the pressurizing air. Referring to FIG. 2, it is seen that the members 16 and 18 define respectively facing surfaces 40 and 42, and that these surfaces cooperate with seal lips 44 and 46 respectively, to form a bearing seal. The lips 44 and 46 are best seen in FIG. 3 as comprising radially separated, axially extending portions of the cage 36.

The lip 44 is provided with a narrow faced land 48 which extends radially inwardly from the lip a short distance and the narrow faced land 50 on the lip 46 extends radially outwardly substantially a like distance. Preferably, the radial distance between the faces of the lands 48 and 50 is slightly greater than the normal clearance between the surfaces 40 and 42 on the bearing members 16 and 18, in order that the lips 44 and 46 will be resiliently deflected toward each other when the bearing 10 is assembled. With such a structure, the lands 48 and 50 bear resiliently and lightly on the surfaces 40 and 42 to effectively prevent escape of pressurizing air from the garment at the joint.

Preferably, the ball cage 36, together with lips 44 and 46, and lands 48 and 50 comprise a unitary structure fabricated from one of the low-friction type plastic materials such as a polytetrafluoroethylene material known as Teflon. It will be observed that the lips 44 and 46 are angularly disposed with respect to one another, the actual angle being preferably of 20°—22°, which has been shown in actual tests to provide a structure for an effective seal against a pressure differential there across of about 5 pounds per square inch. It will be noted that the higher pressure is applied to the inner angled surfaces of the lips, which design factor lends enhancement to the seal of the lands 48 and 50 against the bearing member surfaces 40 and 42 respectively.

In a typical bearing structure for a rotary joint and a pressurizable garment in which the joint has an over all diameter somewhat more than 9 inches but less than 10 inches, the bearing members 16 and 18 might be fabricated of aluminum, for example, with a nominal clearance space bPtween the seal surfaces 40 and 42 of about 0.040 inches. would In such a case, the cage 36 would typically have a radial thickness of about 0.030 to 0.035 inches, and the free standing distance across the undeflected lips 40 and 46 from the inner surface of the land 48 to the outer surface of the land 50 would be typically on the order of about 0.050 inches. In other words, the lips 44 and 46 w4uld be squeezed toward each other by about 0.010 inches upon assembly of the bearing and would bear compliantly upon the surfaces 40 and 42 by reason of the inherent resiliency of the plastic material from which the cage 36 was fabricated.

We claim:
1. A bearing apparatus comprising:
a first annular bearing member defining a first seal bearing surface, said first surface being substantially cylindrical and axially-extending,
a second annular bearing member defining a second seal bearing surface, said second surface being substantially cylindrical and coaxial with said first surface, said second surface being spaced radially from said first surface,
an annular seal element disposed between said first and second seal bearing surfaces, said element having an outwardly projecting lip and an inwardly projecting lip, said lips defining an annular channel between said lips allowing radial movement of said lips relative to each other, said lips each having an outer, axially extending surface in engagement with one of said seal bearing surfaces, said seal element being resiliently flexible and said outer surfaces being normally spaced apart a greater radial distance than said first and second surfaces to provide a radially biased sealing engagement between said outer surfaces and said first and second surfaces,
said annular bearing members defining raceway surfaces substantially facing each other;
a plurality of friction reducing rolling elements being disposed between said members in contact with said raceway surfaces;
annular cage means connected to said seal element for separating said roller elements from each other and for retaining said seal element at a predetermined axial position relative to said bearing surfaces
said cage means being arranged in a manner imparting rotation to said seal element in response to relative rotation between said bearing members; and
fluid means establishing a gas pressure differential across the lips of said seal element, the pressure in said channel being greater than the pressure on the outer surface of said lips to urge said lips radially toward said seal bearing surfaces, whereby said seal prevents flow of gas axially along the space between said bearing member.
2. The apparatus of claim 1 in which:
said seal element and said cage means comprise a one-piece integral member.
3. The apparatus of claim 2 in which:
said lips of said seal element extend generally outwardly from an edge of said annular cage, said lips being continuous around the entire circumference of said cage.
4. The apparatus of claim 3 in which:
said seal element and said retaining means are formed integrally of a polytetrafluoroethylene plastic material.

* * * * *